(12) United States Patent
Kaufmann et al.

(10) Patent No.: US 9,542,348 B2
(45) Date of Patent: Jan. 10, 2017

(54) ARBITRATION MONITORING FOR SERIAL ATTACHED SMALL COMPUTER SYSTEM INTERFACE SYSTEMS DURING DISCOVERY

(71) Applicant: LSI CORPORATION, San Jose, CA (US)

(72) Inventors: Reid A. Kaufmann, Wichita, KS (US); Charles D. Henry, Wichita, KS (US); Jeffrey D. Weide, Wichita, KS (US); James A. Seely, Wichita, KS (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 333 days.

(21) Appl. No.: 14/248,171

(22) Filed: Apr. 8, 2014

(65) Prior Publication Data
US 2015/0286600 A1    Oct. 8, 2015

(51) Int. Cl.
*G06F 13/40* (2006.01)
*G06F 13/366* (2006.01)
*G06F 3/06* (2006.01)

(52) U.S. Cl.
CPC ............. *G06F 13/4045* (2013.01); *G06F 3/06* (2013.01); *G06F 13/366* (2013.01); *G06F 13/4022* (2013.01); *G06F 13/4031* (2013.01)

(58) Field of Classification Search
CPC  G06F 13/4045; G06F 13/4022; G06F 13/366; G06F 13/4031; G06F 3/06
See application file for complete search history.

(56) References Cited

U.S. PATENT DOCUMENTS

| 7,584,319 | B1  | 9/2009  | Liao |
| 8,560,746 | B2  | 10/2013 | Honjo |
| 8,843,671 | B1* | 9/2014  | Tabor ...................... G06F 3/061 710/15 |
| 9,026,843 | B2* | 5/2015  | Kaufmann ........... G06F 11/201 714/6.2 |
| 2004/0190554 | A1 | 9/2004 | Galloway |
| 2013/0166788 | A1* | 6/2013 | Katano ................... G06F 3/061 710/15 |
| 2014/0143464 | A1* | 5/2014 | Natrajan ............ G06F 13/4027 710/117 |
| 2015/0033074 | A1* | 1/2015 | Pinglikar ................ G06F 13/00 714/21 |

OTHER PUBLICATIONS

U.S. Appl. No. 13/962,694, to Kaufmann et al., filed Aug. 8, 2013. "Information technology—SAS Protocol Layer—3 (SPL-3)" Working Draft Project American National Standard T10/BSR INCITS 492, Revision 4, Jul. 24, 2013, available via www.t10.org. Section 4.12, "Phy events".

* cited by examiner

*Primary Examiner* — Glenn A Auve (57) ABSTRACT

Methods and structure for detecting that arbitration is delaying discovery. One embodiment is a Serial Attached Small Computer System Interface (SAS) expander. The SAS expander includes multiple SAS ports, a port monitor, and a controller. The port monitor is able to track physical link events during arbitration for at least one of the ports while discovery is in progress at the expander, and to detect based on the physical link events that arbitration is delaying discovery. The controller is able to prioritize discovery requests at the expander responsive to detecting that arbitration is delaying discovery.

20 Claims, 8 Drawing Sheets

ARBITRATION MONITORING FOR SERIAL ATTACHED SMALL COMPUTER SYSTEM INTERFACE SYSTEMS DURING DISCOVERY

FIELD OF THE INVENTION

The invention relates generally to Small Computer System Interface (SCSI) systems, and more specifically to Serial Attached SCSI (SAS) systems.

BACKGROUND

SAS domains often utilize a large number of interconnected devices (e.g., initiators, targets, and expanders) to store, retrieve, and/or maintain data for a host. At start-of-day, these devices engage in a process known as discovery, wherein they identify other SAS and/or Serial Advanced Technology Attachment (SATA) devices that are available for communication on the domain. A number of processes may trigger discovery within a SAS domain. For example, discovery may be triggered when an initiator fails or is disconnected during a period of heavy Input/Output traffic with other devices, causing an established SAS link to fail.

SUMMARY

Systems and methods herein determine when arbitration processes are delaying discovery in a SAS domain.

One exemplary embodiment is a Serial Attached Small Computer System Interface (SAS) expander. The SAS expander includes multiple SAS ports, a port monitor, and a controller. The port monitor is able to track physical link events during arbitration for at least one of the ports while discovery is in progress at the expander, and to detect based on the physical link events that arbitration is delaying discovery. The controller is able to prioritize discovery requests at the expander responsive to detecting that arbitration is delaying discovery.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
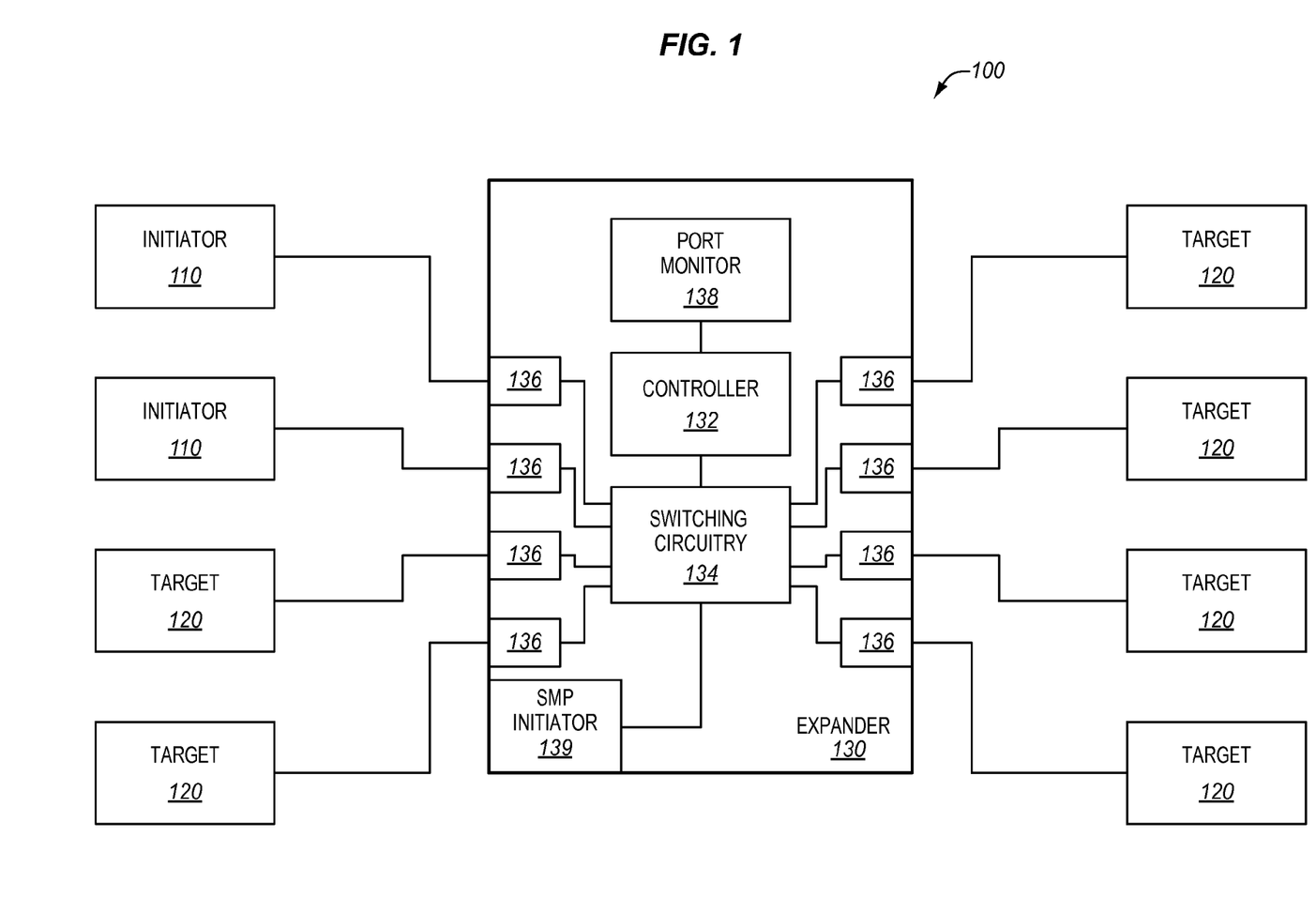
FIG. 1 is a block diagram of an exemplary SAS domain.

FIG. 1 is a block diagram of an exemplary SAS domain 100. SAS domain 100 establishes connections between initiators and targets (known collectively as "end devices") in order to enable Input/Output (I/O) operations between those devices. In this embodiment, SAS domain 100 includes SAS initiators 110 which are coupled via expander 130 to targets 120.

SAS initiators 110 may transmit and receive data within SAS domain 100 on behalf of a host system (e.g., a server or computer). SAS initiators 110 comprise any suitable devices or components that are compliant with SAS protocols such as Serial SCSI Protocol (SSP), SATA Tunneling Protocol (STP), Serial Management Protocol (SMP), etc. For example, in one embodiment SAS initiators 110 comprise Host Bus Adapters (HBAs) that utilize SSP to exchange I/O with target devices. Target devices 120 comprise any SAS and/or SATA compliant target devices, such as storage devices (e.g., disk drives, etc.).

Expander 130 is a device that establishes point-to-point connections between end devices in accordance with SAS protocols. Specifically, expander 130 includes multiple SAS PHYs 136 that can be coupled/paired with one another via switching circuitry 134 (e.g., a crossbar switch) in order to service connections between different end devices. PHYs 136 of expander 130 are logically arranged into ports (e.g., wide ports that are each made up of multiple PHYs, and/or narrow ports that are each made up of a single PHY).

In this embodiment, expander 130 is known as a self-configuring expander because it includes Serial Management Protocol (SMP) initiator 139. SMP initiator 139 is capable of generating and transmitting discovery requests through PHYs 136. Responses to these discovery requests may then be used to populate a routing table at expander 130, informing expander 130 of the relative location of each other device on SAS domain 100. This routing table may then be used to guide the operations of switching hardware 134 as it couples PHYs 136 together to service various requests.

Expander 130 also includes controller 132, which manages the operations of expander 130, and may be implemented for example as custom circuitry, a processor executing programmed instructions stored in program memory, or some combination thereof.

When multiple connection requests (e.g., Open Address Frames (OAFs)) compete for the same port, controller 132 engages in SAS arbitration to determine which connection request to service via the port. As a part of the SAS arbitration process, the request having the longest Arbitration Wait Time (AWT) will be given priority to use the PHY.

SAS arbitration is known to occur during discovery, but can cause problems at an expander in a way that interferes with discovery. Consider an example where an initiator 110 fails while a target 120 is attempting to complete a request from the initiator 110. In such a case, I/O from the target 120 is often given priority to use a port coupled to the initiator 110, because the target 120 has been attempting to re-establish a connection with the initiator 110 since the initiator 110 failed (in fact, there are likely to be many targets that are each attempting to service an outstanding request from failed initiator 110). Since the initiator 110 is unavailable (and because this has not yet been determined by discovery processes), target 120 continues to re-try the connection, which renders the port unavailable to other requests. This means that discovery requests directed to the port (e.g., by SMP initiator 139) cannot be serviced, and discovery cannot complete. Since discovery cannot complete, the target 120 continues re-trying the connection, and therefore the target 120 continues to interfere with discovery in an ongoing cycle.

To address this problem, expander 130 includes port monitor 138. During discovery, port monitor 138 monitors PHY events that occur on one or more ports of expander 130. These PHY events indicate whether arbitration is interfering with discovery at expander 130. If discovery is being unduly interfered with, port monitor 138 may report this information, and controller 132 may then prioritize discovery requests in order to ensure that they are not stalled out by arbitration. Port monitor 138 may comprise a portion of controller 132, may comprise an independent circuitry component, a processor implementing logical instructions, etc.

While only one expander is shown in FIG. 1, any number of expanders or similar routing elements can be combined to form a "switched fabric" of interconnected elements between initiators and targets in SAS architecture 100. Furthermore, the particular arrangement, number, and configuration of components described herein is exemplary and non-limiting.

Figure 2:
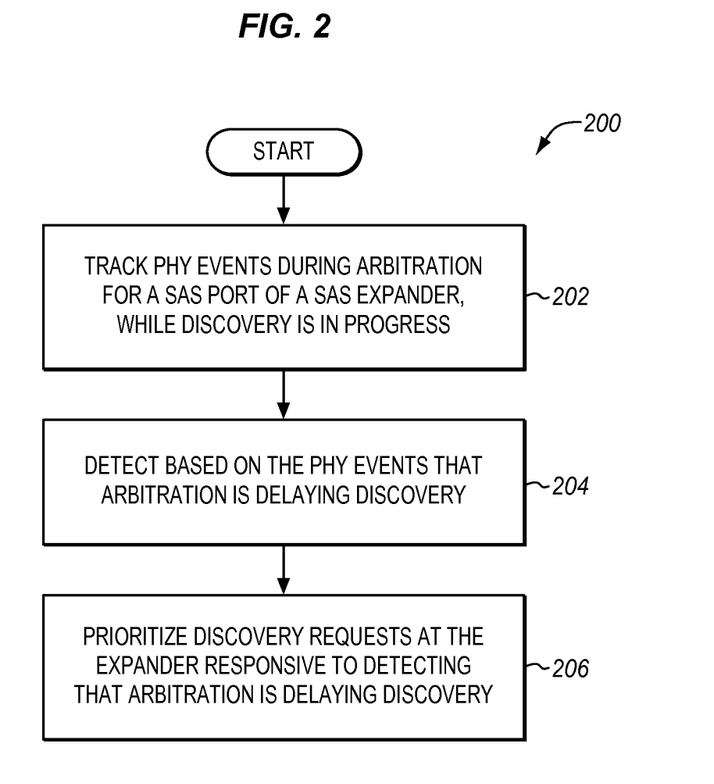
FIG. 2 is a flowchart describing an exemplary method to operate an expander of a SAS domain.

FIG. 2 is a flowchart describing an exemplary method 200 to operate an expander of a SAS domain. Assume, for this embodiment, that expander 130 has been utilizing a pair of PHYs 136 to establish connections between an initiator 110 and a target 120. Further, assume that the initiator 110 has failed or otherwise become unavailable before the target 120 has responded to an I/O request. This problem at the initiator 110 triggers discovery at expander 130, and also causes the target 120 to continue attempting to respond to the (now unavailable) initiator 110. Thus, during the discovery process, I/O responses from the target 120 and discovery requests from SMP initiator 139 compete for access to the PHY leading to the initiator 110, causing arbitration to ensue.

Because arbitration and discovery are in progress, port monitor 138 attempts to determine whether or not the arbitration is unduly interfering with/delaying the discovery process. To this end, in step 202 port monitor 138 tracks PHY events (which are described, for example, within the SAS Specification, such as the SAS 3.0, revision 4 specification, §4.12, issued on Jul. 24, 2014, and herein incorporated by reference) for a SAS port at expander 130, while discovery and arbitration are in progress for that port. This tracking can be performed, for example, for all PHYs of the port being tracked. The PHY events tracked by port monitor 138 may comprise, for example, an Arbitration Wait Time (AWT), a received Arbitration In Progress (AIP) count, a received Arbitration in Progress (AIP) (WAITING ON PARTIAL) count, a received AIP (WAITING ON CONNECTION) count, a connection count for each PHY of the port, and/or a peak transmitted pathway blocked count.

Port monitor 138 may track the PHY events for the port continuously or periodically (e.g., every period of time, every number of clock cycles, every time an OPEN_REJECT is sent, etc.) in order to determine whether discovery requests are being unduly interfered with by the arbitration process.

In some embodiments, port monitor 138 tracks PHY events that occur at each port of expander 130. In further embodiments, there are multiple port monitors that each monitor PHY events at a different port of expander 130. In still further embodiments, port monitor 138 maintains a register for each PHY of the port(s) being tracked, and updates each register with information such as a peak arbitration time for the corresponding PHY.

In step 204, port monitor 138 detects, based on the PHY events, that arbitration is delaying discovery. Certain trends in PHY events may be considered "triggering events" showing that arbitration at expander 130 has delayed discovery (e.g., to the point where discovery requests will not be completed). In one embodiment, a triggering event is detected when a peak arbitration time for each PHY (or even one PHY) of one of the monitored port(s) exceeds a threshold of any suitable value (e.g., one hundred milliseconds). The threshold value can be configured depending on the particular applications serviced by SAS domain 100, the size of SAS domain 100, the latency of one or more targets, and any other suitable factors. In a further embodiment, a triggering event is detected when the peak arbitration times of each PHY of all monitored ports exceed the threshold. In further embodiments, triggering events are detected based on PHY events such as AWTs, received AIP counts, and/or connection counts for each PHY of the monitored port(s).

In step 206, controller 132 prioritizes discovery requests at expander 130, responsive to detecting that arbitration is delaying discovery. Any number of processes or techniques may be utilized to prioritize the discovery requests. For example, in one embodiment expander 130 inflates the arbitration wait times of discovery requests (e.g., discovery related SMP requests) in order to give the discovery requests higher priority. In another embodiment expander 130 selectively suspends arbitration processes to allow the discovery requests to complete (as discussed in U.S. patent application Ser. No. 13/962,694, to Kaufmann et al., filed on Aug. 8, 2013, and incorporated herein by reference).

Even though the steps of method 200 are described with reference to SAS domain 100 of FIG. 1, method 200 can be performed in other systems. The steps of the flowcharts described herein are not all inclusive and can include other steps not shown. The steps described herein can also be performed in an alternative order.

In a further embodiment, controller 132 operates expander 130 to transmit a broadcast primitive to other expanders in SAS domain 100. The broadcast primitive, because it is a SAS primitive, is not interrupted/delayed by ongoing arbitration processes, but rather ignores arbitration. Therefore, the primitive establishes contact with other expanders, regardless of whether the ports coupled to those expanders are presently busy.

In one embodiment, the broadcast primitive is a vendor-specific command capable of indicating that the other expanders of SAS domain 100 should also modify their own arbitration processes in order to facilitate the processing of discovery requests. In this manner, expander 130 quickly informs other expanders of any detected discovery problems, without the other expanders having to make such a determination on their own.

In a further embodiment, peak transmitted arbitration wait time and peak arbitration time are summed and compared against a threshold value to determine if arbitration is interfering with discovery processes.

EXAMPLES

In the following examples, additional processes, systems, and methods are described in the context of a SAS domain that detects and resolves arbitration-related issues with SAS discovery.

Figure 3:
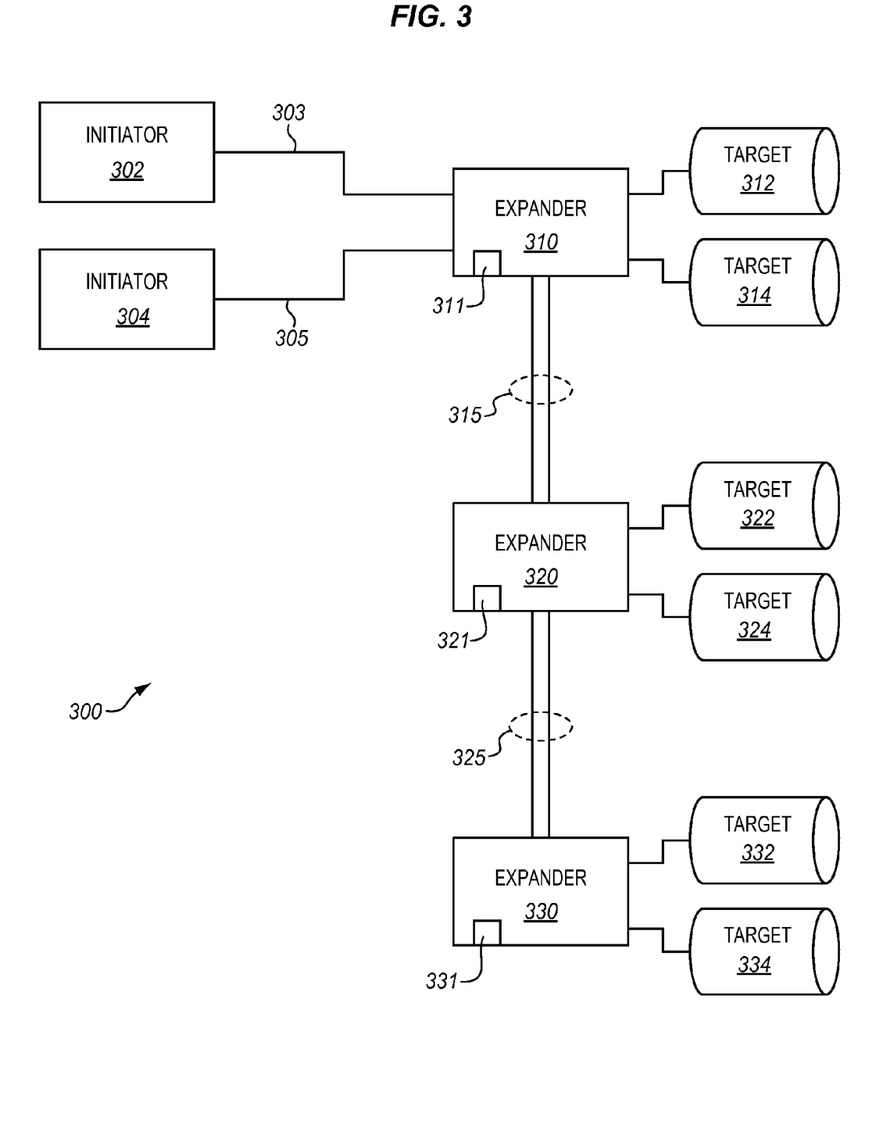
FIG. 3 is a block diagram illustrating an exemplary cascaded SAS domain.

FIG. 3 is a block diagram illustrating an exemplary deeply cascaded SAS domain 300. As used herein, the term "deeply cascaded" is used to indicate that initiators 302 and 304 are separated from certain targets (e.g., 332, 334) by a large number of intervening expanders. According to FIG. 3, initiators 302 and 304 are coupled via pathways 303 and 305, respectively, to expander 310. Expander 310 is itself coupled with targets 312 and 314. Expander 310 is also coupled via pathway 315 to expander 320, and expander 320 is coupled via pathway 325 to expander 330. Expander 320 is coupled with targets 322 and 324, and expander 330 is coupled with targets 332 and 334. As shown herein, each expander has a corresponding SMP initiator (311, 321, 331) used for generating SMP discovery requests.

Assume, for this example, that initiator 302 encounters a failure (e.g., becomes physically disconnected) while each of the targets of SAS domain 300 is attempting to respond to initiator 302. Because the connections have been interrupted, the targets each attempt to reconnect with initiator 302 by transmitting OPEN Address Frames (OAFs) to it. Because of the numerous conflicting requests, expanders 310, 320, and 330 become involved in arbitration in order to decide which requests to service first for the ports which connect to initiator 302. However, the connections cannot be established because initiator 302 is unavailable, and initiator 302 has not yet been determined to be offline by discovery processes.

Because initiator 302 is not yet known to be offline, the OAFs received at expander 330 and 320 are responded to with Arbitration In Progress (AIP)—Wait Connection primitives, which do not reject any of the OAFs, but cause them to wait. Meanwhile, OAFs received at expander 310 receive OPEN_REJECT (RETRY) responses, which do not cancel connection but rather allow a target device increase its AWT and to re-send an OAF.

At some point, the failure of initiator 302 causes each of the expanders (310, 320, 330) to engage in discovery. Specifically, discovery begins because the expander to which failed initiator 302 was attached (expander 310) sends a broadcast change primitive to the rest of the SAS domain. Unfortunately, because the failure of initiator 302 takes time to detect, the SMP discovery requests are generated after the OAFs from the targets on SAS domain 300, and thereby have shorter AWTs than the OAFs. This means that the SMP discovery requests would not normally be serviced by the expanders (owing to the higher-priority requests from the targets).

Figure 4:
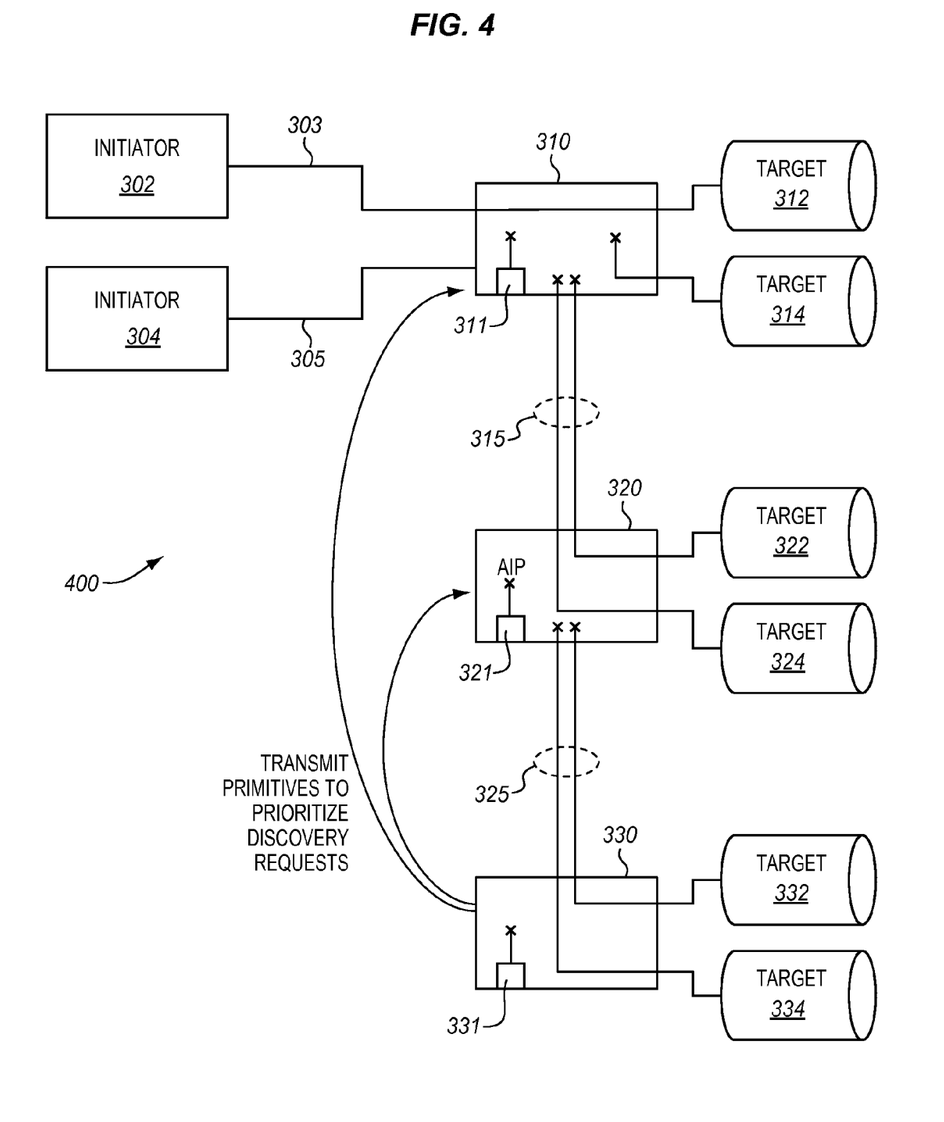
FIG. 4 is a block diagram illustrating an exemplary SAS domain where arbitration is interfering with the processing of discovery requests.

FIG. 4 is a block diagram illustrating SAS domain 300, wherein arbitration is interfering with the processing of discovery requests. The "X" symbols indicate connections that are requested, but are not currently being serviced because they are arbitrated/delayed owing to other requests with higher AWT. Thus, these pending and unserviced requests continue to increase their AWTs owing to received AIP (e.g., as shown being received by SMP initiator 321 in FIG. 4) or OPEN REJECT (RETRY) responses. Since discovery is not completed, the connection requests are not resolved.

To address this problem, each expander in SAS domain 300 includes a port monitor, and each port monitor is configured to monitor a group of ports defined by a member PHY list. In this example, the member PHY list for each expander describes each PHY for each port of that expander. The port monitors then track PHY events at each of the ports defined in the member PHY list. If, during discovery, all of the PHYs of the ports being tracked by a port monitor reach a peak arbitration time that is longer than a threshold value (in this example, one hundred milliseconds), then the port monitor detects this as a triggering event, and reports that discovery requests should be prioritized within the expander. The arbitration processes at the expander are then modified so that discovery requests are prioritized (i.e., prioritized over/with respect to other requests for the SAS domain) using any suitable technique.

Any SAS expander that has detected such a triggering event also generates and transmits a vendor specific broadcast primitive (herein, "RECOVERY_ACTIVATION") to each other expander on SAS domain 300, in order to direct the other expanders of SAS domain 300 to also prioritize their own discovery requests. In this manner, discovery requests can be quickly processed by SAS domain 300.

Figure 5:
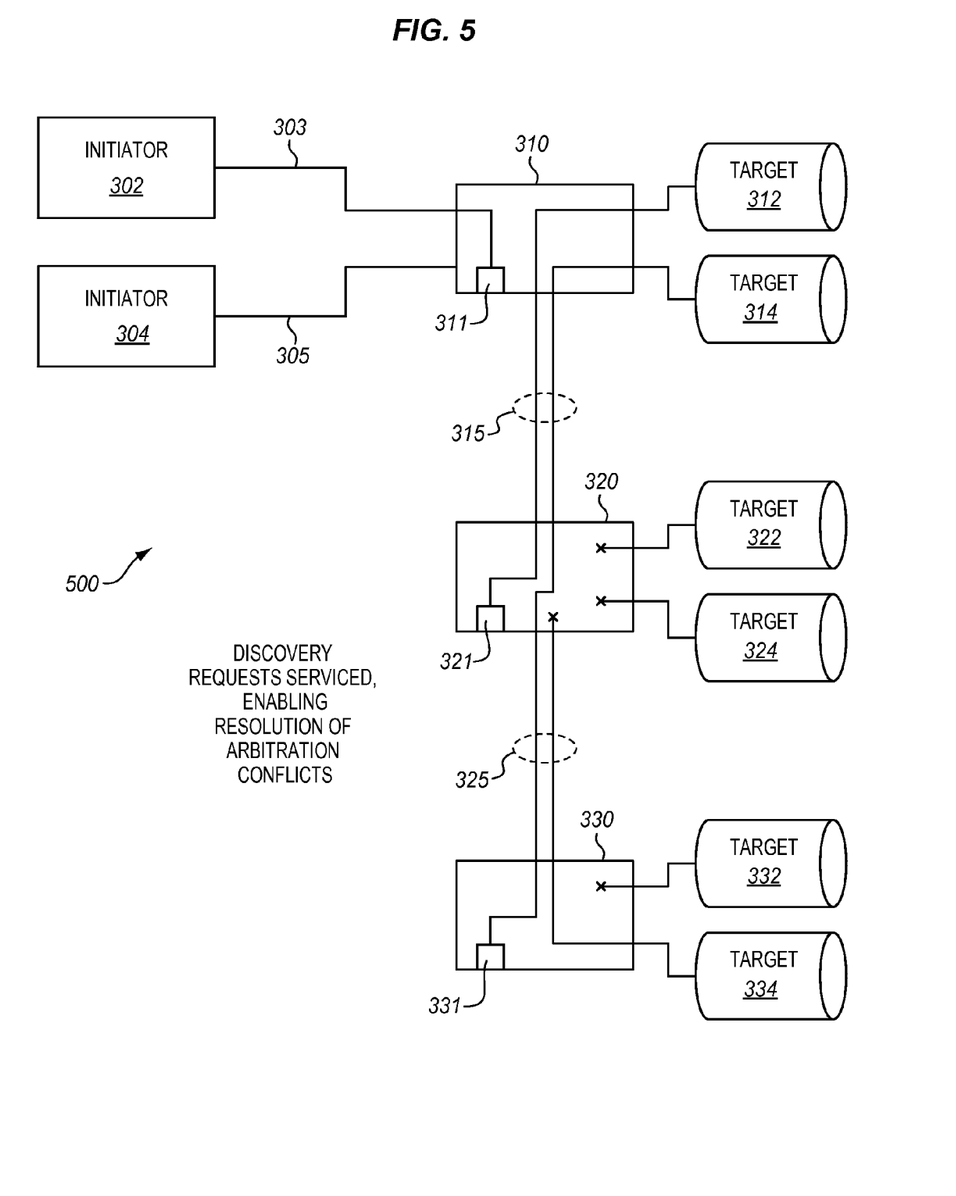
FIG. 5 is a block diagram illustrating the exemplary SAS domain of FIG. 4 after SAS primitives have been transmitted to prioritize discovery requests.

FIG. 5 is a block diagram illustrating the exemplary SAS domain of FIG. 4 after SAS primitives have been transmitted to prioritize discovery requests. The discovery requests quickly poll each of the devices on the SAS domain, and are resolved to determine that initiator 302 is unavailable. Once this information has been populated into the routing tables of the expanders, expander 310 may respond to the OAFs directed to initiator 302 with an OPEN REJECT (NO DESTINATION) response, which prevents the targets from continuing to retry (currently unavailable) initiator 302. This quickly and efficiently resolves any arbitration-related traffic issues within SAS domain 300.

Figure 6:
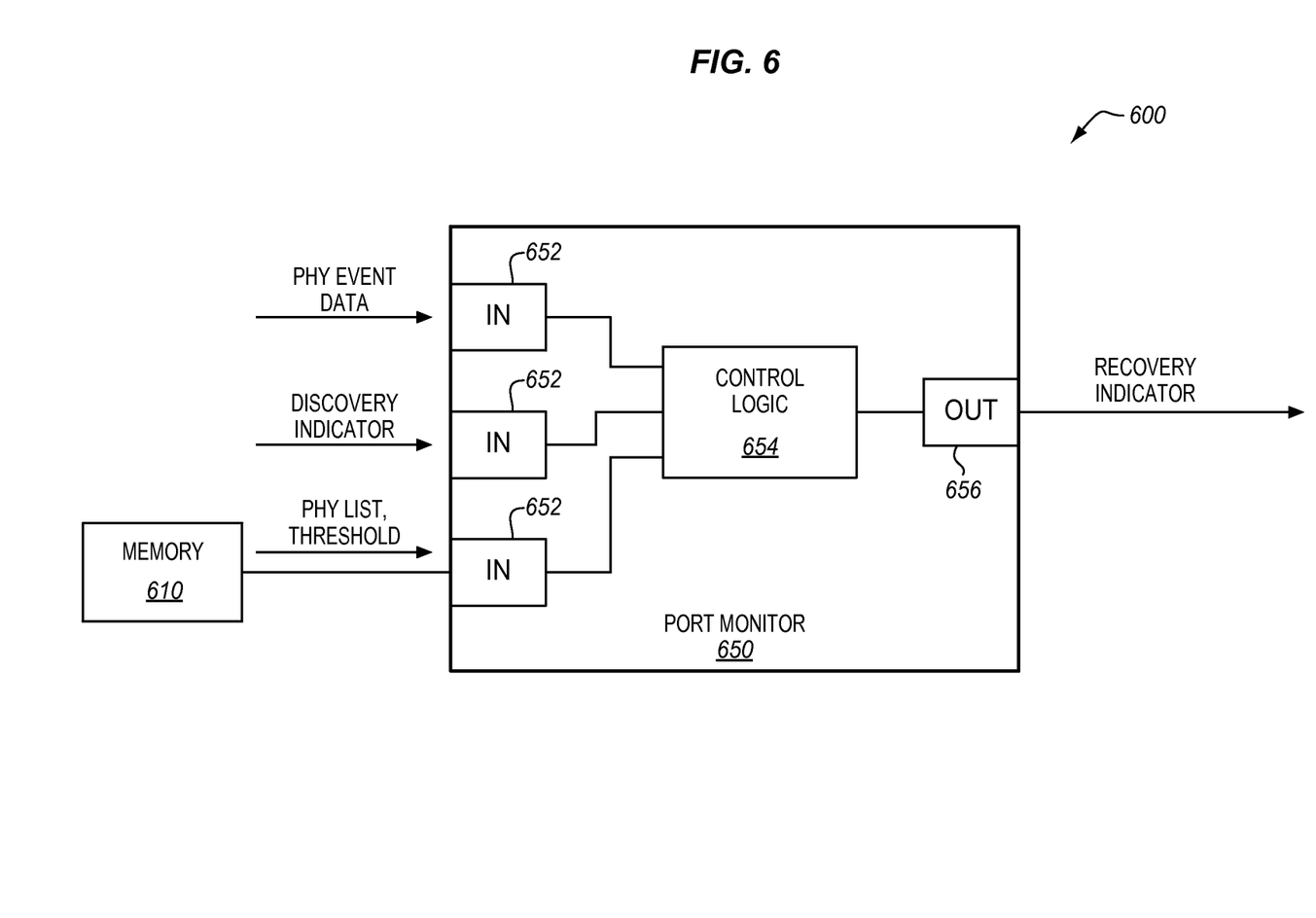
FIG. 6 is a block diagram illustrating an exemplary port monitor of a SAS expander.

FIG. 6 is a block diagram 600 illustrating an exemplary port monitor 650 of a SAS expander. In this embodiment, port monitor 650 transitions between several states based upon received data at inputs 652. The received data includes tracked PHY event data for each monitored port, and a discovery indicator signal (e.g., from a controller of the expander) indicating whether discovery is currently in progress. The received data also includes information retrieved from memory 610 (e.g., a nonvolatile memory at expander 130), such as a PHY member list indicating which ports should be tracked by port monitor 650, as well as a threshold for any measured Peak Arbitration Time.

Port monitor 650 uses output 656 to indicate a "NORMAL" recovery indicator state (e.g., to a controller of the expander) when discovery is not occurring at the expander. However, when discovery initiates, control logic 654 transitions port monitor 650 into a "NORMAL_DISCOVERY" state, during which PHY events for ports on the member PHY list are tracked. Specifically, Peak Arbitration Times are stored in a "congestion threshold register" for review. If the Peak Arbitration Times for each PHY being tracked exceed the threshold value (e.g., at the same time), then control logic 654 decides that a triggering event has been encountered, and outputs the "RECOVERY" state to trigger modifications to the arbitration processes happening within the expander. The RECOVERY state continues until discovery completes for the expander, at which time port monitor 650 returns to the NORMAL state. Conversely, if the RECOVERY state is not encountered and discovery completes, port monitor 650 transitions from NORMAL_DISCOVERY back to NORMAL.

Figure 7:
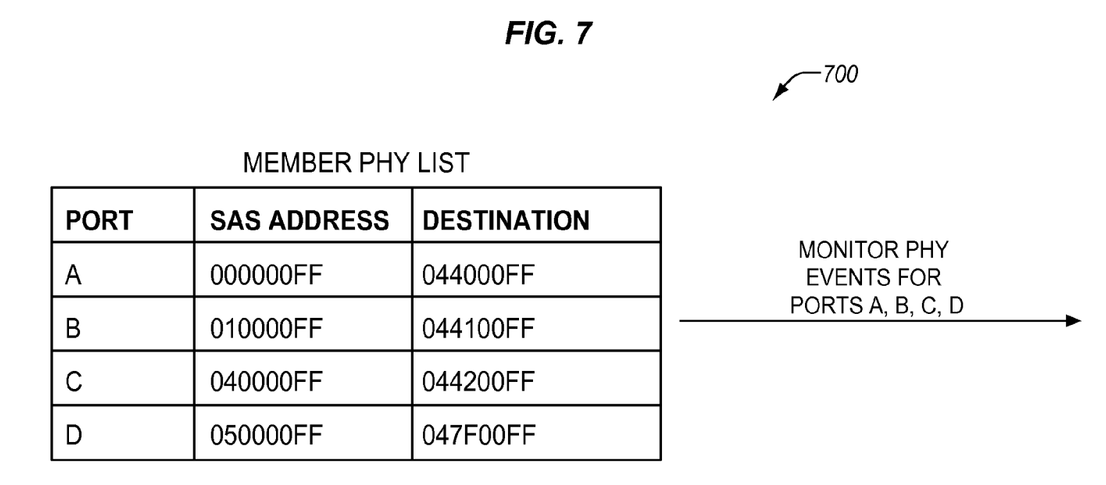
FIG. 7 is a block diagram illustrating an exemplary member PHY list accessed by a port monitor.

FIG. 7 is a block diagram illustrating an exemplary member PHY list 700 accessed by a port monitor. The diagram lists, for each port, the PHYS that correspond to each port. Since a port is determined dynamically by the SAS addresses on both ends (all PHYs sharing an address being members of the same port), in this embodiment the member PHYs are listed by their port SAS addresses and the address of the SAS device they are attached to. Thus, a SAS expander may rapidly identify PHYs of a port by checking their SAS address. In a further embodiment, the member PHY list changes dynamically as cables are attached/detached to/from an expander.

Figure 8:
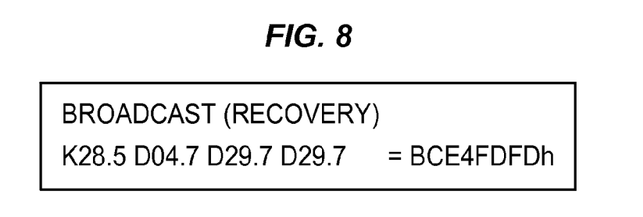
FIG. 8 is a block diagram illustrating an exemplary RECOVERY_ACTIVATION broadcast primitive.

FIG. 8 is a block diagram illustrating an exemplary RECOVERY_ACTIVATION broadcast primitive. Such a RECOVERY_ACTIVATION broadcast primitive may be utilized in order to inform other elements of a SAS domain to prioritize discovery requests in a suitable manner.

Figure 9:
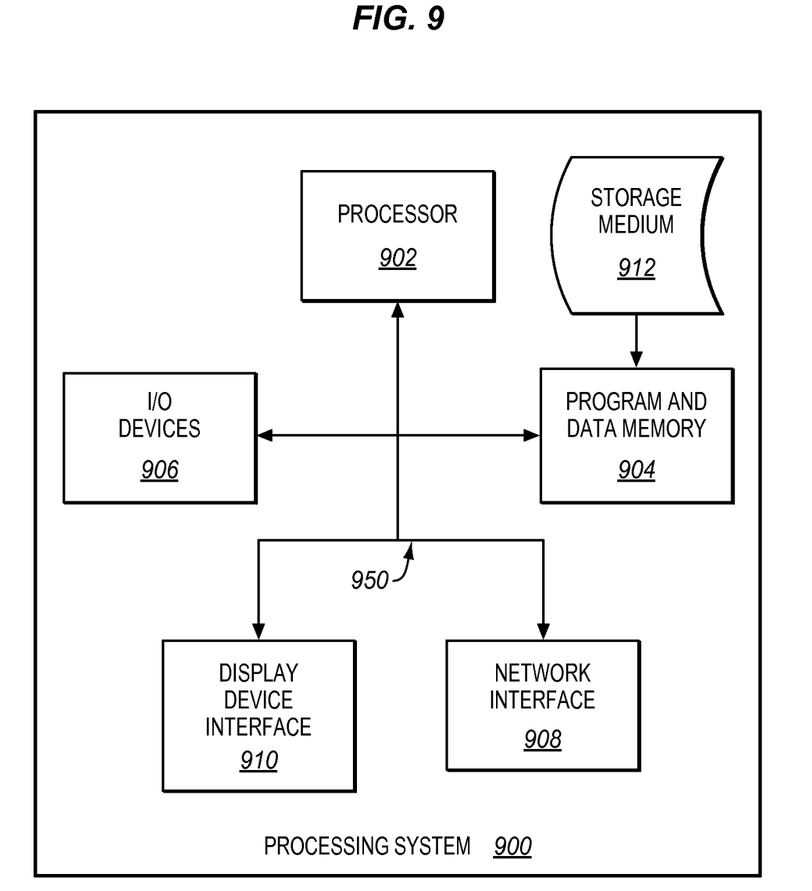
FIG. 9 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of expander 130 to perform the various operations disclosed herein. FIG. 9 illustrates an exemplary processing system 900 operable to execute a computer readable medium embodying programmed instructions. Processing system 900 is operable to perform the above operations by executing programmed instructions tangibly embodied on computer readable storage medium 912. In this regard, embodiments of the invention can take the form of a computer program accessible via computer readable medium 912 providing program code for use by a computer (e.g., processing system 900) or any other instruction execution system. For the purposes of this description, computer readable storage medium 912 can be anything that can contain or store the program for use by the computer (e.g., processing system 900).

Computer readable storage medium 912 can be an electronic, magnetic, optical, electromagnetic, infrared, or semiconductor device. Examples of computer readable storage medium 912 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 900, being suitable for storing and/or executing the program code, includes at least one processor 902 coupled to program and data memory 904 through a system bus 950. Program and data memory 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc.) can be coupled either directly or through intervening I/O controllers. Network adapter interfaces 908 can also be integrated with the system to enable processing system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 910 can be integrated with the system to interface to one or more display devices, such as printing systems and screens for presentation of data generated by processor 902.

What is claimed is:

1. A Serial Attached Small Computer System Interface expander, comprising:
   multiple Serial Attached Small Computer System Interface ports;
   a port monitor operable to track physical link events during arbitration for at least one of the ports while discovery is in progress at the expander, and to detect based on the physical link events that arbitration is delaying discovery; and
   a controller operable to prioritize discovery requests at the expander responsive to detecting that arbitration is delaying discovery.

2. The expander of claim 1, wherein:
   the physical link events tracked by the port monitor comprise a peak arbitration time, and
   the port monitor is operable to detect that arbitration is delaying discovery by determining that a peak arbitration time for each physical link of a port being tracked exceeds a threshold.

3. The expander of claim 2, wherein:
   the port monitor is further operable to track peak arbitration times for each of the multiple ports of the expander; and
   the port monitor is operable to detect that arbitration is delaying discovery by determining that each of the peak arbitration times exceeds the threshold.

4. The expander of claim 1, wherein:
   the port monitor is further operable to track physical link events comprising at least one event selected from the group consisting of: a peak arbitration time, a peak transmitted Arbitration Wait Time (AWT), a received Arbitration In Progress (AIP) count, a received AIP (WAITING ON CONNECTION) count, a received AIP (WAITING ON PARTIAL) count, a connection count, and a peak transmitted pathway blocked count.

5. The expander of claim 1, wherein:
   the expander is located within a Serial Attached Small Computer System Interface domain comprising multiple other expanders; and
   the controller is further operable to transmit a Serial Attached Small Computer System Interface broadcast primitive to the other expanders, directing each of the other expanders to prioritize discovery requests, responsive to detecting that arbitration is delaying discovery.

6. The expander of claim 1, wherein:
   the port monitor is further operable to access a list that identifies each physical link of at least one of the ports of the expander.

7. The expander of claim 1, wherein:
   the expander comprises a port monitor for each of the multiple ports; and
   each port monitor is operable to perform the steps of tracking and detecting for a corresponding port of the expander.

8. A method comprising:
   tracking physical link events during arbitration for at least one Serial Attached Small Computer System Interface port of an expander while discovery is in progress at the expander;
   detecting, based on the physical link events, that arbitration is delaying discovery; and prioritizing discovery requests at the expander responsive to detecting that arbitration is delaying discovery.

9. The method of claim 8, wherein:
the physical link events comprise a peak arbitration time, and
detecting that arbitration is delaying discovery comprises determining that a peak arbitration time for each physical link of a port being tracked exceeds a threshold.

10. The method of claim 9, further comprising:
tracking peak arbitration times for each of multiple Serial Attached Small Computer System Interface ports of the expander; and
detecting that arbitration is delaying discovery comprises determining that each of the peak arbitration times exceeds the threshold.

11. The method of claim 8, wherein:
the physical link events comprise at least one event selected from the group consisting of: a peak arbitration time, a peak transmitted Arbitration Wait Time (AWT), a received Arbitration In Progress (AIP) count, a received AIP (WAITING ON CONNECTION) count, a received AIP (WAITING ON PARTIAL) count, a connection count, and a peak transmitted pathway blocked count.

12. The method of claim 8, wherein:
the expander is located within a Serial Attached Small Computer System Interface domain comprising multiple other expanders; and the method further comprises:
transmitting a Serial Attached Small Computer System Interface broadcast primitive to the other expanders that directs each of the other expanders to prioritize discovery requests, responsive to detecting that arbitration is delaying discovery.

13. The method of claim 8, further comprising:
accessing a list that identifies each physical link of at least one of the ports of the expander.

14. The method of claim 8, wherein:
the expander comprises a port monitor for each of multiple Serial Attached Small Computer System Interface ports, and the method further comprises:
operating each of the port monitors to perform the steps of tracking and detecting for a corresponding port of the expander.

15. A Serial Attached Small Computer System Interface expander, comprising:
multiple Serial Attached Small Computer System Interface ports;

a means for tracking physical link events during arbitration for at least one of the ports while discovery is in progress at the expander, and for detecting based on the physical link events that arbitration is delaying discovery; and
a means for prioritizing discovery requests at the expander responsive to detecting that arbitration is delaying discovery.

16. The expander of claim 15, wherein:
the physical link events comprise a peak arbitration time, and
the means for tracking is operable to detect that arbitration is delaying discovery by determining that a peak arbitration time for each physical link of a port being tracked exceeds a threshold.

17. The expander of claim 16, wherein:
the means for tracking is further operable to track peak arbitration times for each of the multiple ports of the expander; and
the means for tracking is operable to detect that arbitration is delaying discovery by determining that each of the peak arbitration times exceeds the threshold.

18. The expander of claim 15, wherein:
the means for tracking is further operable to track physical link events comprising at least one event selected from the group consisting of: a peak arbitration time, a peak transmitted Arbitration Wait Time (A WT), a received Arbitration In Progress (AIP) count, a received AIP (WAITING ON CONNECTION) count, a received AIP (WAITING ON PARTIAL) count, a connection count, and a peak transmitted pathway blocked count.

19. The expander of claim 15, wherein:
the expander is located within a Serial Attached Small Computer System Interface domain comprising multiple other expanders; and
the means for prioritizing is further operable to transmit a Serial Attached Small Computer System Interface broadcast primitive to the other expanders, directing each of the other expanders to prioritize discovery requests, responsive to detecting that arbitration is delaying discovery.

20. The expander of claim 15, wherein:
the means for tracking is further operable to access a list that identifies each physical of at least one of the ports the expander.

* * * * *